March 15, 1938.  A. J. HOLMAN  2,110,875

FILM FEEDING MECHANISM

Filed Dec. 10, 1934  2 Sheets-Sheet 1

Inventor
Arthur J. Holman.

March 15, 1938.  A. J. HOLMAN  2,110,875
FILM FEEDING MECHANISM
Filed Dec. 10, 1934   2 Sheets-Sheet 2
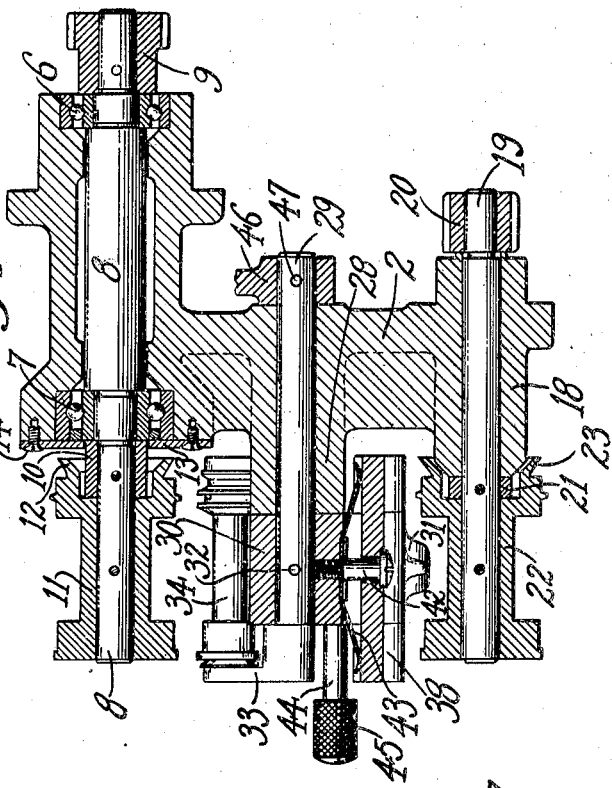
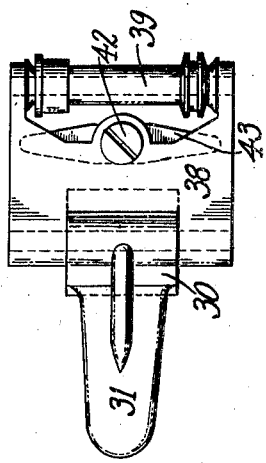
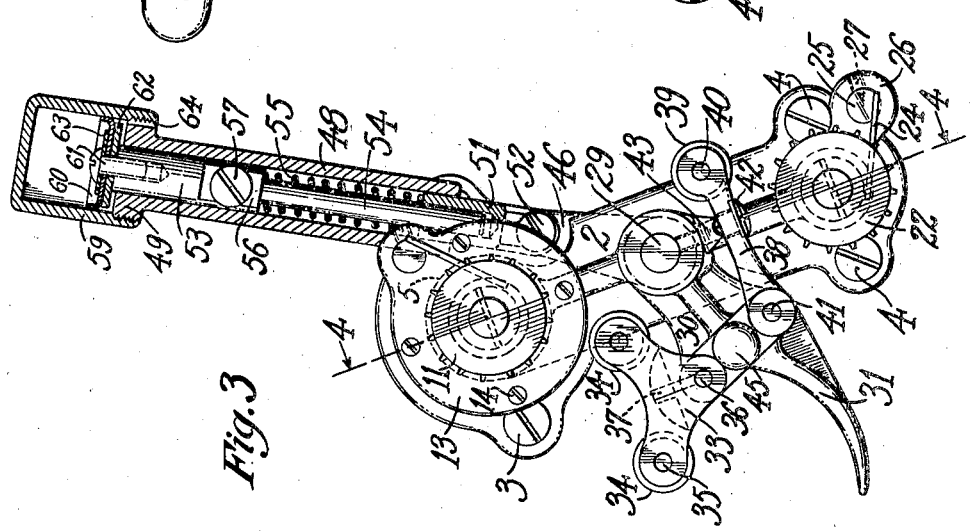
Inventor
Arthur J. Holman Patented Mar. 15, 1938

2,110,875

UNITED STATES PATENT OFFICE 2,110,875

FILM FEEDING MECHANISM

Arthur J. Holman, East Orange, N. J.

Application December 10, 1934, Serial No. 756,764

10 Claims. (Cl. 271—2.3)

My invention relates to improvements in film feeding mechanism obtained by arranging sprockets in pairs and providing unit construction and single control for the idler rollers associated with the sprockets thus paired. My improved construction may be adapted to any pair of sprockets in any mechanism wherein a free loop of film or other flexible perforated material, is formed and maintained between two sprockets, but it is especially advantageous in motion picture projection apparatus wherein the film strip is actuated continuously and at uniform velocity throughout the entire mechanism. It is well suited for use in a sound film projector of the type disclosed in Letters Patent of the United States No. 1,987,623, dated January 15, 1935, and its application thereto will be more fully described hereinafter. It has been the object of my invention to provide compact, effective film feeding mechanism, simplified film threading, and improved idler roller action particularly during the passage of a film patch over a sprocket. The unit construction hereinafter more fully described, makes for simplicity, thereby providing space for pneumatically damped, spring-actuated idler operating mechanism; and the single control simplifies the film threading operation. My device provides smoother and quicker action of the idler rollers when a film patch passes over the aperture feed sprocket, thereby minimizing the transient effects of the passage of the film patch upon the movement of the film strip over the aperture plates.

My invention may be best understood by reference to the accompanying drawings in which—

Fig. 3 shows the idler roller mechanism in position for threading the film strip on the sprockets, the pneumatic spring control member being cut away to show its construction.

Fig. 4 is a section on line 4—4 of Fig. 3, showing unit construction of the paired sprockets and idler roller mechanism.

Fig. 5 is a bottom view of the idler operating finger grip, the take-up sprocket idler roller, and its supporting yoke.

Figure 2:
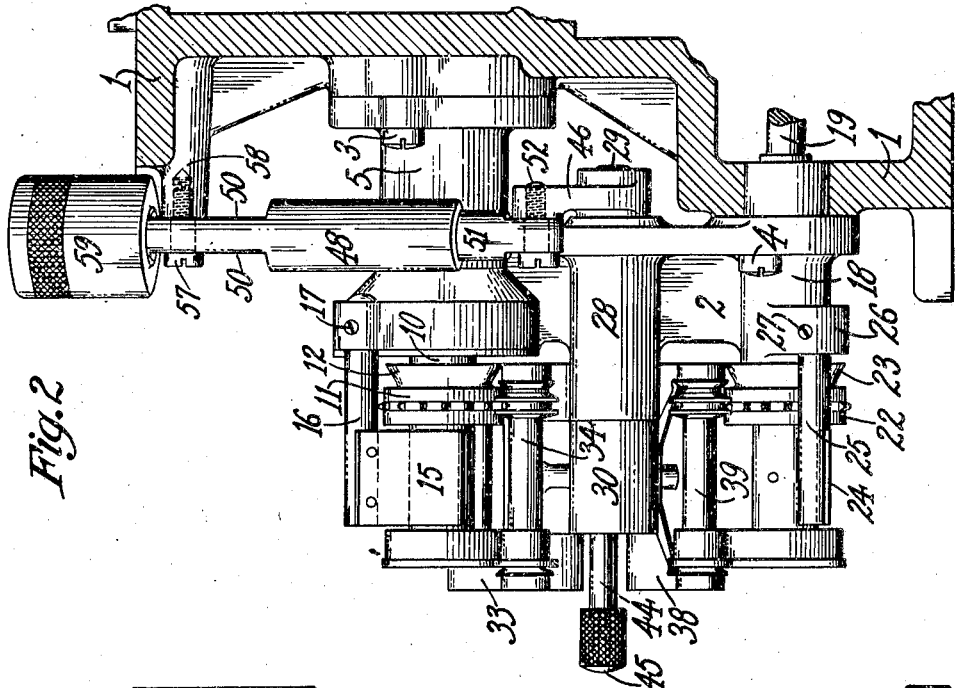
Fig. 2 is a front view of the paired sprockets and idler roller mechanism shown in Fig. 1.

Referring now more specifically to the drawings, in which like reference numerals indicate like parts, 1 is the lower main frame member of a non-intermittent motion picture projector mechanism, to which is secured the bracket 2, by means of the screws 3 and 4. A long annular boss 5, (Fig. 4) at one extremity of the bracket 2, carries in one end a ball bearing 6, and in the other a felt-sealed ball bearing 7, and within these bearings is journaled the sprocket shaft 8. A driving gear 9, is pinned to one end of the sprocket shaft 8, and shoulders against the bearing 6. A collar 10, also pinned to the shaft 8, shoulders against the bearing 7, thus preventing end play in the shaft 8. The aperture feed sprocket 11, provided with integral oil throw ring 12, shoulders against the collar 10, and is also pinned to shaft 8. The driving gear 9, is operated from a gear in an oil-filled chamber in the main frame 1, and a cover plate 13, fitting closely around shaft 8, and attached by screws 14, to the sprocket end of boss 5, on bracket 2, retains the bearing 7, in position and acts as an additional oil seal. A stripper plate 15, (Fig. 2) is riveted to a stud 16, which enters a bore in the sprocket end of boss 5, and is retained therein by the set screw 17.

At the opposite end of the bracket 2, is the integral annular boss 18, wherein is journaled the sprocket shaft 19, on one end of which is press fitted the driving gear 20. A collar 21, pinned to the shaft 19, shoulders against one end of the boss 18, and the gear 20, shoulders against the opposite end, thus effectively preventing end play in the shaft 19. The take-up sprocket 22, which is provided with integral oil throw ring 23, fitting over the beveled end of the annular boss 18, shoulders against the collar 21, and is also pinned to the shaft 19. The driving gear 20, is operated from a gear in an oil-filled chamber in the main frame 1. A stripper plate 24 (Fig. 2) is riveted to a stud 25, which enters a bore in a boss 26, on the sprocket end of the boss 18, and is retained therein by the set screw 27.

A third boss 28, (Fig. 4) integral with the bracket 2, contains a bore the axis of which is parallel to, mid-way between, and in the plane of the axes of the shafts 8 and 19, and within this bore is rotatably mounted the idler mechanism supporting stud 29. The idler supporting member 30, (Fig. 3) having the integral finger grip 31, is mounted on the stud 29, and is secured thereto by the pin 32. A two-roller idler yoke 33, carrying rollers 34, supported on shafts 35, is hingedly attached to the idler supporting member 30, by the stud 36, which is press fitted into member 30, and is a free turning fit in the yoke 33. A pin 37, is press fitted into the idler supporting member 30, and projects through a clearance hole in the yoke 33, thereby limiting the hinge action on the stud 36. The shafts 35, are press fitted into the rollers 34, and are a free running fit in the yoke 33. The rollers 34, are formed as shown, so as to retain the film strip in engagement with the teeth on sprocket 11, and in contact with areas at both ends of the sprocket, the rollers themselves making contact with the surface of the film only on areas outside of the photographic sound and picture records.

A single roller idler yoke 38, carrying roller 39, supported on shaft 40, is hingedly attached to the idler supporting member 30, by the stud 41, which is press fitted into member 30, and is a free turning fit in the yoke 38. A screw 42, is threaded into the member 30, and projects through a clearance hole in yoke 38, the length of screw 42, being such that its head limits the downward movement of yoke 38, on stud 41, so that roller 39, just clears sprocket 22, when the idler mechanism is in the operating position (shown in Fig. 1) and there is no film between the sprocket and roller. A leaf spring 43, containing a clearance hole through which passes the screw 42, is inserted between member 30, and yoke 38, and provides resilient yielding means for maintaining pressure at all times on the film strip as it passes over sprocket 22. The roller 39 is identically the same in form as rollers 34. The finger grip 31, offers convenient means for shifting the idler roller mechanism to the "open" position so the film strip may be threaded over the sprockets, and the stud 44, having knurled head 45, is press fitted into idler supporting member 30, to provide convenient means for tripping the idler closing mechanism, the construction of which will now be described.

A pneumatically damped, spring-actuated, idler closing mechanism is operatively attached to idler mechanism supporting stud 29, through the crank member 46, (Figs. 3 and 4) which fits over stud 29, and is secured thereto by pin 47. A tubular member 48, having at one end an enlarged threaded head 49, has opposite walls cut away for a portion of its length commencing under the enlarged head 49, as shown at 50, (Figs. 1 and 2) and into its other end is press fitted the stud 51. The stud 51, has a bore extending through its upper portion which is concentric with the cylindrical chamber in the tubular member 48, and its lower portion is flattened on two sides and drilled to receive shouldered screw 52, which passes through stud 51, and is threaded into the swinging end of crank member 46 (Fig. 2) thereby hingedly connecting tubular member 48, with the idler supporting mechanism. Within tubular member 48, and freely slidable therein, is the plunger 53, having a lower portion 54, of reduced diameter, which slides freely in the bore in the upper portion of stud 51. A coil spring 55, surrounding the lower portion 54, of plunger 53, is compressed between the upper end of stud 51, and plunger 53, and exerts a force between these members which tends to push plunger 53, out of the upper end of tubular member 48. A portion 56, on plunger 53, is flattened and drilled to receive a shouldered screw 57, which passes through plunger 53, and is threaded into a boss 58, on lower main frame member 1, (Fig. 2) thereby hingedly connecting plunger 53, to main frame member 1, and thus providing a footing for the compressed spring 55, whereupon the spring may act to return the idler mechanism to the "closed" (operating) position when pivot screw 52, (Fig. 3) is moved slightly to the right and out of alignment with idler mechanism supporting stud 29, and pivot screw 57, which misalignment may be accomplished by slight upward pressure on knurled head 45.

To prevent a too rapid downward movement of tubular member 48, which would cause rollers 34, to strike sprocket 11, with excessive and perhaps damaging force, I have provided a pneumatic cushioning effect in the following manner:—A hollow cap 59, having a smooth bore, is suitably threaded to screw over the enlarged threaded end 49, of tubular member 48, and within this bore is fitted a leather pump washer 60, which is attached to the end of plunger 53, by the screw 61, and is suitably supported from below by washer 62, and from above by washer 63, the washers being also held in position by screw 61. The pump washer 60, is so placed that air will be compressed in hollow cap 59, by the downward movement of tubular member 48, as coil spring 55, acts to return the idler mechanism to the "closed" (operating) position, and, obviously, the amount of air cushioning may be reduced by providing a small orifice in the closed end of hollow cap 59. To prevent pneumatic resistance to the opening of the idler mechanism, which is opened by applying pressure downwardly to finger grip 31, (Fig. 1) a slot 64, is cut in the enlarged head 49, of tubular member 48, to permit free passage of air into or out of hollow cap 59 below pump washer 60.

In opening the idler mechanism for threading, pressure is applied downwardly to finger grip 31, till stud 51, contacts with annular boss 5, on bracket 2, at which position the axis of screw 52, will have crossed the straight line joining the center of stud 29, with the center of screw 57, thereby locking the idler mechanism in "open" position. Film is then threaded through the projector mechanism, the operator taking care that the film is so placed on the sprockets that sprocket teeth enter the perforations. The resiliency of the film loop formed between the paired sprockets will be sufficient to hold the film in position on the sprockets while the mechanism is being threaded. Then a slight finger pressure on knurled head 45, will trip the idler closing mechanism, rollers 34, settling quietly and without jar against the film on sprocket 11, and being held in position by the action of coil spring 55, which has returned to its position of minimum compression and hence exerts only relatively light pressure against sprocket 11: likewise roller 39, traveling in a tangential direction toward sprocket 22, settles quietly against the film around this sprocket, and is pressed toward the sprocket under the influence of leaf spring 43.

Figure 1:
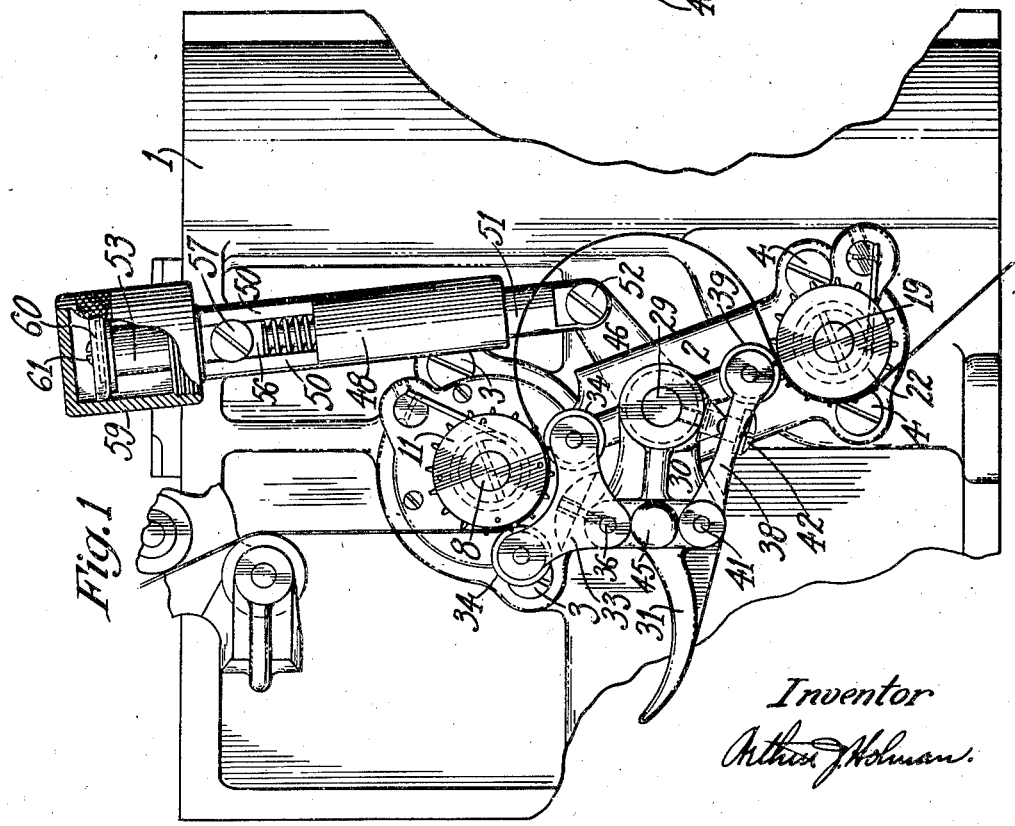
Fig. 1 is a side view of part of a film feeding mechanism showing an aperture feed sprocket and a take-up sprocket paired, the idler rollers being in position to hold the film strip in engagement with the sprockets.

In the unit, as illustrated in Fig. 1, the film is threaded and the mechanism is ready to function as soon as power is applied to drive the sprockets. It is of interest now, to consider the action of the idler mechanism as a film patch travels over the sprockets. The film travels downwardly, so the first action of the patch on the idler mechanism will be to shift the first (upper) roller 34 outwardly from sprocket 11, this movement of this roller with respect to sprocket 11 taking place primarily as a hinge action of yoke 33 about the axis of the second (lower) roller 34, hence this phase of the passing of the patch will produce only a very slight angular displacement of idler supporting member 30, and consequently the transient disturbance caused by the patch passing the first roller 34 will be very slight. When the patch reaches the second (lower) roller 34, idler yoke 33 again goes through a hinge action, but this time the movement takes place primarily around the axis of the first (upper) roller 34. Thus the rocking action of yoke 33, first about one roller and then about the second roller, absorbs most of the shock caused as the patch passes over sprocket 11. The very slight displacement of idler supporting member 30, which the patch produces when passing under the first roller 34, is transmitted through the idler mechanism to coil spring 55, and, because of the mass and consequent inertia of the parts involved in this movement, the patch will have had time to clear the second roller 34 before idler supporting member 30 shall have been returned to its normal operating position by the action of coil spring 55, hence a patch, in passing completely over sprocket 11, causes but one slight movement of the idler operating mechanism. The added thickness of a patch is accommodated at roller 39 by hinge action of yoke 38 on stud 41, and the roller is returned to normal operating position by leaf spring 43, as soon as the patch clears the roller, the passage of the patch under roller 39 causing no disturbance whatever to idler supporting member 30. The rollers and their supporting yokes are relatively light in weight, hence the above described rocking motion of yoke 33 and the swinging motion of yoke 38, take place quickly and without jar to the film feeding mechanism, and the idler mechanism is quietly returned to normal operating position as soon as the film patch has cleared the rollers. Thus my improved idler mechanism not only provides easy passage for film patches, thereby lengthening the life of the film, but also minimizes the disturbance to uniformity of movement of the film across the aperture plates, which helps the quality of both sound and picture.

The adaptation of my present invention to a sound film projector having a built-in sound reproducer, such as is disclosed in Letters Patent of the United States No. 1,987,623 hereinabove referred to, requires considerable change in the film feeding mechanism illustrated in Fig. 1 of that patent. In using paired sprocket units, the sprockets 63 and 26 form one unit, and the sprockets 9 and 65 form the other unit of a sound film feeding mechanism, and when the sprockets are thus paired, the sprockets 26 and 9 must be mounted on the mechanism main frame instead of on the aperture unit as shown. This arrangement, however, simplifies the aperture unit. the aperture feed sprocket gear train, and the fire shutter mechanism, and offers other advantages, all of which are fully disclosed in a copending application Serial No. 757,451, filed December 14, 1934.

While the drawings in the present application illustrate a unit comprising an aperture feed sprocket, a take-up sprocket, and idler roller mechanism associated therewith, it is to be understood that any two sprockets between which a free film loop is formed and maintained, may be thus paired regardless of how the individual sprockets are driven. For instance, in the above mentioned patent, the sprocket 26 is film driven and the upper feed sprocket 63 is gear driven, but in my improved sound film feeding mechanism employing paired sprocket units, these sprockets are paired in the same manner as the sprockets illustrated in the accompanying drawings. It is to be understood therefore, that the appended claims are drawn to cover any and all apparatus, whether used in film feeding mechanisms or otherwise, wherein sprockets are paired in the manner and for the purposes herein specified.

Having thus fully described my invention, what I claim is—

1. In a film feeding mechanism, a unit comprising two rotatably mounted sprockets, means for maintaining constant spacing between said sprockets, means for rotating said sprockets, and an idler supporting member common to and hingedly mounted between said sprockets.

2. In a film feeding mechanism, a unit comprising two film sprockets, shafts whereon said sprockets are mounted, members wherein said shafts are journaled, means for rotating said sprockets, and an idler supporting member common to both sprockets and hingedly mounted between the same.

3. In a film feeding mechanism, a unit comprising two film sprockets, shafts whereon said sprockets are mounted, members wherein said shafts are journaled, means for rotating said sprockets, and an idler supporting member hingedly mounted between said sprockets, said idler supporting member being adapted and arranged to be rotated manually to permit threading film over said sprockets, and to be returned automatically to operating position.

4. In a film feeding mechanism, a unit comprising two film sprockets, shafts whereon said sprockets are mounted, members wherein said shafts are journaled, means for rotating said sprockets, an idler mechanism including rollers associated with each of said sprockets, a pair of yokes wherein said rollers are rotatably supported, a common supporting member for said yokes, means adapted and arranged to be operated manually to open said idler mechanism for the purpose of threading film over said sprockets, and means adapted and arranged to return said idler mechanism automatically to operating position when said last mentioned means is released.

5. An idler mechanism comprising a hingedly mounted idler supporting member, a pair of yokes hingedly attached to said supporting member, rollers rotatably mounted in said yokes, and means associated with each of said yokes adapted and arranged to limit the hinge action thereof, said idler mechanism being adapted and arranged to retain film in engagement with a pair of sprockets.

6. An idler mechanism comprising a rotatably mounted supporting stud, an idler supporting member fixed on said supporting stud, a two-roller and a single roller yoke each hingedly attached to said idler supporting member, means adapted and arranged to limit the hinge action between said yokes and said idler supporting member, rollers rotatably mounted in said yokes, and resilient means associated with each of said yokes, said resilient means being adapted and arranged to press said rollers against a film threaded over two sprockets, thereby retaining said film in engagement with both of said sprockets.

7. An idler closing mechanism comprising a crank member fixed on an idler mechanism supporting stud, a plunger pivotally mounted on a film feeding mechanism main frame, a tubular member wherein said plunger slides freely, means whereby said tubular member is hingedly connected at one end to the swinging end of said crank member, and spring means adapted and arranged to apply force between said plunger and said tubular member, said force tending to push said tubular member off of said plunger when said crank member swings under the influence of said spring means.

8. An idler closing mechanism comprising a crank member fixed on an idler mechanism supporting stud, a plunger pivotally mounted on a film feeding mechanism main frame, a tubular member wherein said plunger slides freely, means whereby said tubular member is hingedly connected at one end to the swinging end of said crank member, spring means adapted and arranged to apply force between said plunger and said tubular member, said force tending to push said tubular member off of said plunger when said crank member swings under the influence of said spring means, and a pneumatic means connecting said plunger and said tubular member, said pneumatic means being adapted and arranged to cushion the action of said idler closing mechanism.

9. In a film feeding mechanism, a unit comprising two rotatably mounted sprockets, means for maintaining constant spacing between said sprockets, means for rotating said sprockets, an idler mechanism common to both sprockets, and an idler operating mechanism including means for manually opening said film feeding mechanism for the purpose of threading, and pneumatically cushioned spring actuated means for closing said idler mechanism without shock to said film feeding mechanism.

10. In a film feeding mechanism, a unit comprising two film sprockets, shafts whereon said sprockets are mounted, members wherein said shafts are journaled, means for rotating said sprockets, an idler mechanism common to both sprockets, and an idler operating mechanism including means for manually opening said film feeding mechanism for the purpose of threading, automatic locking means for holding said mechanism in open position, means for tripping said locking means, and pneumatically cushioned spring actuated means adapted and arranged automatically to return said idler mechanism to operating position without shock to said film feeding mechanism.

ARTHUR J. HOLMAN.